No. 686,769. Patented Nov. 19, 1901.
J. L. SCUDDER.
HARROW ATTACHMENT.
(Application filed June 24, 1901.)
(No Model.) 2 Sheets—Sheet 1.
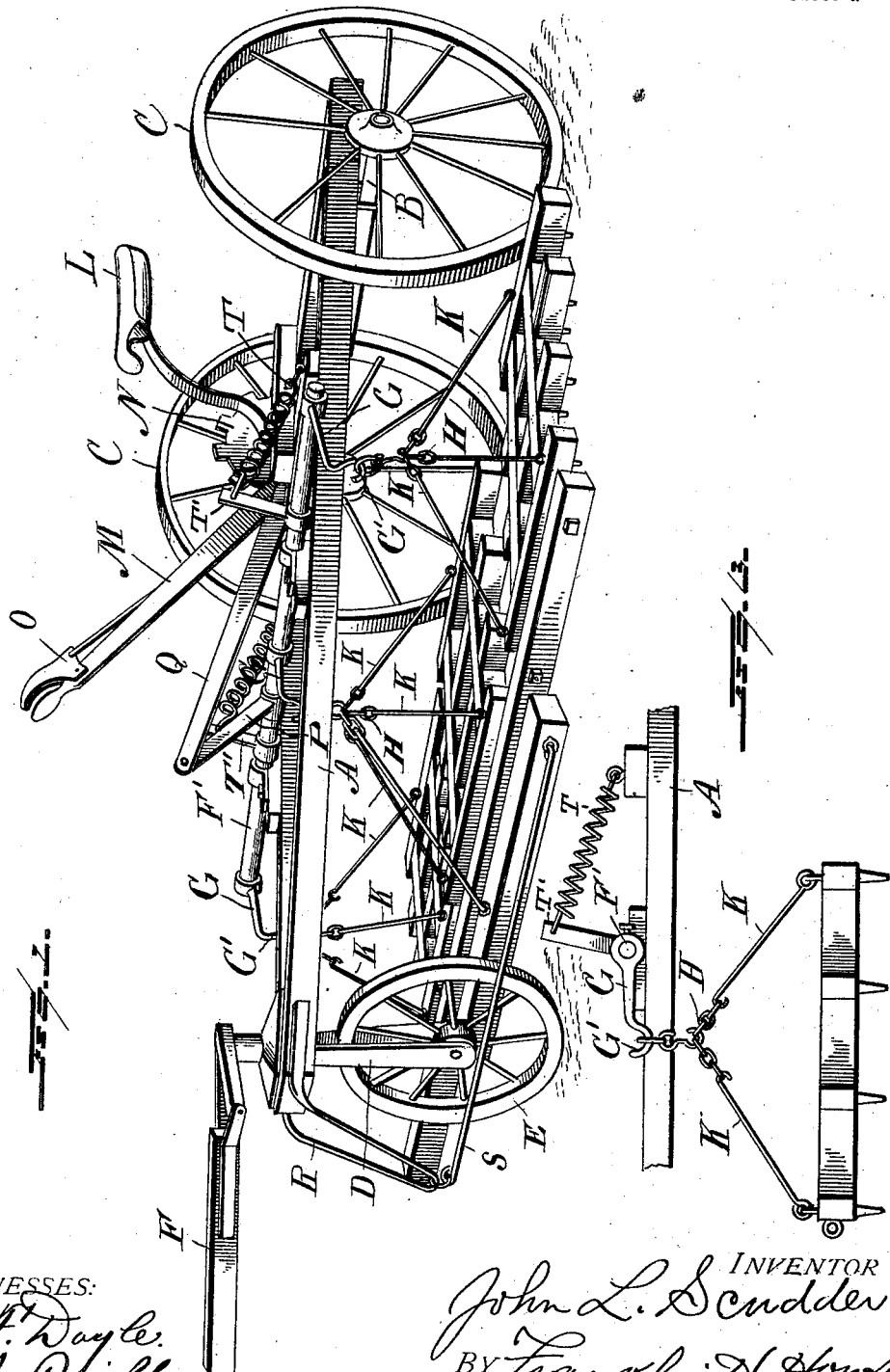
WITNESSES:
INVENTOR
John L. Scudder
BY Franklin N. Hough
Attorney
THE NORRIS PETERS CO., PHOTO-LITHO., WASHINGTON, D. C.

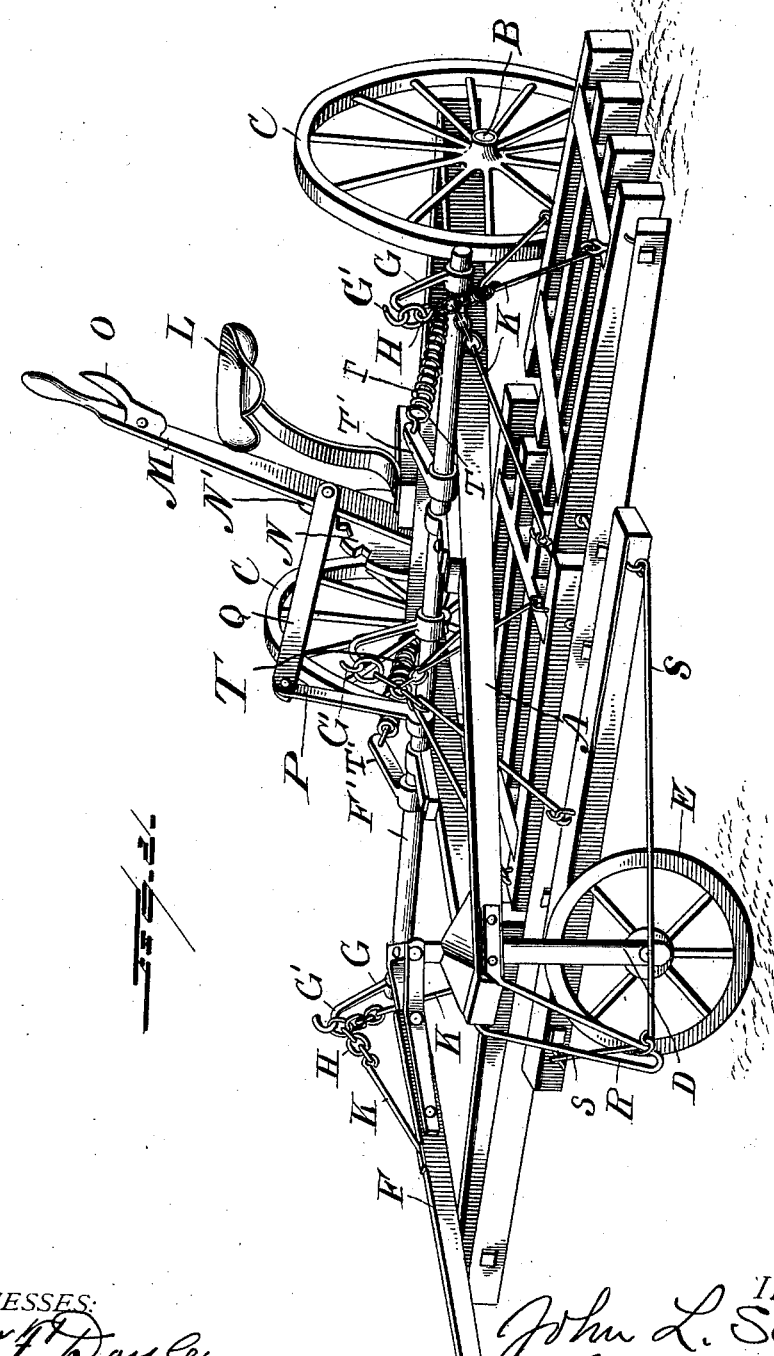

UNITED STATES PATENT OFFICE.

JOHN L. SCUDDER, OF BEDFORD, IOWA.

HARROW ATTACHMENT.

SPECIFICATION forming part of Letters Patent No. 686,769, dated November 19, 1901.

Application filed June 24, 1901. Serial No. 65,821. (No model.)

*To all whom it may concern:*

Be it known that I, JOHN L. SCUDDER, a citizen of the United States, residing at Bedford, in the county of Taylor and State of Iowa, have invented certain new and useful Improvements in Harrow Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in harrow attachments, and especially to a frame designed to carry the harrow, means being provided to raise and lower the harrow and mechanism provided for steering the harrow-carrying frame.

In carrying out my invention I improve upon the features of my previous invention, upon which Letters Patent were granted to me in December, 1894, No. 531,009.

My invention will be hereinafter more fully described and then specifically defined in the appended claims and illustrated in the accompanying drawings, which, with the letters of reference marked thereon, form a part of this application, in which drawings similar letters of reference indicate like parts in the views, and in which—

Figure 1 is a perspective view of the harrow-carrying frame, shown with the harrow at its lowest limit. Fig. 2 is a similar view showing the harrow raised to its highest limit. Fig. 3 is a detailed view of one of the harrow-sections, showing mechanism for raising the same.

Reference now being had to the details of the drawings by letter, A designates the frame of the machine, which has an axle B, mounted in suitable bearings near the rear of the frame, and wheels C are mounted on said axle in the usual manner. The forward end of the frame, which is V-shaped, has swiveled therein the shank portion or head of the forked member D. The arms of the forked end are apertured to receive the axle of the steering-wheel E. To the top of the head of said forked member is pivoted one end of the tongue or shaft F, whereby a horse may guide the truck.

Journaled in suitable bearings on the top of the frame of the truck is a horizontally-disposed shaft F', having a plurality of arms G with hooked ends G', which are connected to chains H, which in turn are connected to links K, that are fastened to the harrow in any suitable manner. The harrow, which may be made up of sections or in one piece, if preferred, has the links K, arranged in groups of preferably three links each, which are connected by chain to one of the hooks G'.

Mounted on a cross-piece of the frame are a seat L and an operating-lever M, pivoted at its lower end to a notched segment-plate N, and N' designates a spring-actuated pawl, which is connected to the hand operating-lever O adjacent to the upper end of the operating-lever M. This lever M is pivoted to a link Q, which in turn is pivoted to an arm P, that is fastened rigidly to the shaft F'. By this means the shaft F' may be rocked and the harrow raised or lowered, as may be desired.

Fastened to the apex of the frame is a clevis-bar R, which is bent downwardly, the ends of the bar being secured to the frame, and to the lower portion of this bar are fastened the forward ends of the rods S, which connect the bar with the front edge of the harrow. To this bar the whiffletree is adapted to be fastened in usual manner.

From the foregoing it will be observed that the guide-wheel is operated by the tongue or shaft secured thereto and the clevis-bar is so positioned that the pull will come as low as possible to the efficient working of the apparatus.

In order to assist in hoisting the handle M to lift the harrow, a spring T is employed, one on each side of the seat, one end of each spring being fastened to an arm T', while its other end is attached to the frame of the truck. These springs are under tension when the harrow is at its lowest limit.

Having thus described my invention, what I claim to be new, and desire to secure by Letters Patent, is—

1. A harrow attachment comprising in combination with the truck, a horizontal shaft journaled thereon, arms carried by said shaft, harrows, link-and-chain connections between said harrows and said arms, an operating-lever, connections between same and the shaft rotating the latter, and springs having connections with the shaft, as set forth.

2. In combination with the truck a shaft horizontally mounted thereon, hooked arms carried by said shaft, harrows having link-and-chain connections with said hooks, upwardly-projecting arms on the shaft, springs connecting said upwardly-projecting arms and stationary portions of the truck, and an operating-lever having pivotal connections with the shaft, as set forth.

In testimony whereof I hereunto affix my signature in presence of two witnesses.

JOHN L. SCUDDER.

Witnesses:
HARRY E. MOOERS,
WILLIAM B. COBB.